United States Patent [19]

Rauch

[11] 4,411,637
[45] Oct. 25, 1983

[54] COMPLIANTLY MOUNTED DAMPING MEANS

[75] Inventor: Burton S. Rauch, Howell, N.J.

[73] Assignee: The Bendix Corporation, Teterboro, N.J.

[21] Appl. No.: 331,502

[22] Filed: Dec. 17, 1981

[51] Int. Cl.³ .............................................. F16F 15/12
[52] U.S. Cl. ..................................... 464/180; 464/150
[58] Field of Search .................. 464/87, 89, 180, 183, 464/181, 155, 156, 158, 179, 169

[56] References Cited

U.S. PATENT DOCUMENTS

| | | | |
|---|---|---|---|
| 1,716,284 | 6/1929 | Risley | 464/183 X |
| 2,671,488 | 3/1954 | Christensen | 464/89 X |
| 2,727,368 | 12/1955 | Morton | 464/180 X |
| 3,296,828 | 1/1967 | Stubner et al. | 464/89 X |
| 3,995,513 | 12/1976 | Amdall et al. | 464/180 X |

Primary Examiner—John M. Jillions
Assistant Examiner—Dao Van Huynh
Attorney, Agent, or Firm—Anthony F. Cuoco; Vett Parsigian

[57] ABSTRACT

A compliantly mounted damper (16,18) for rotating equipment of the type including a rotor shaft (2) and a quill shaft (6) coupling the rotor shaft (2) to a driver shaft (8) is disclosed. The damper includes a plate (14) rigidly mounted to the quill shaft (6) and a plate (16) compliantly mounted to the rotor shaft (2) so that the rotor shaft plate (16) follows the angular displacement of the quill shaft plate (14) due to shaft misalignment which may occur, while torsional damping is achieved.

4 Claims, 1 Drawing Figure

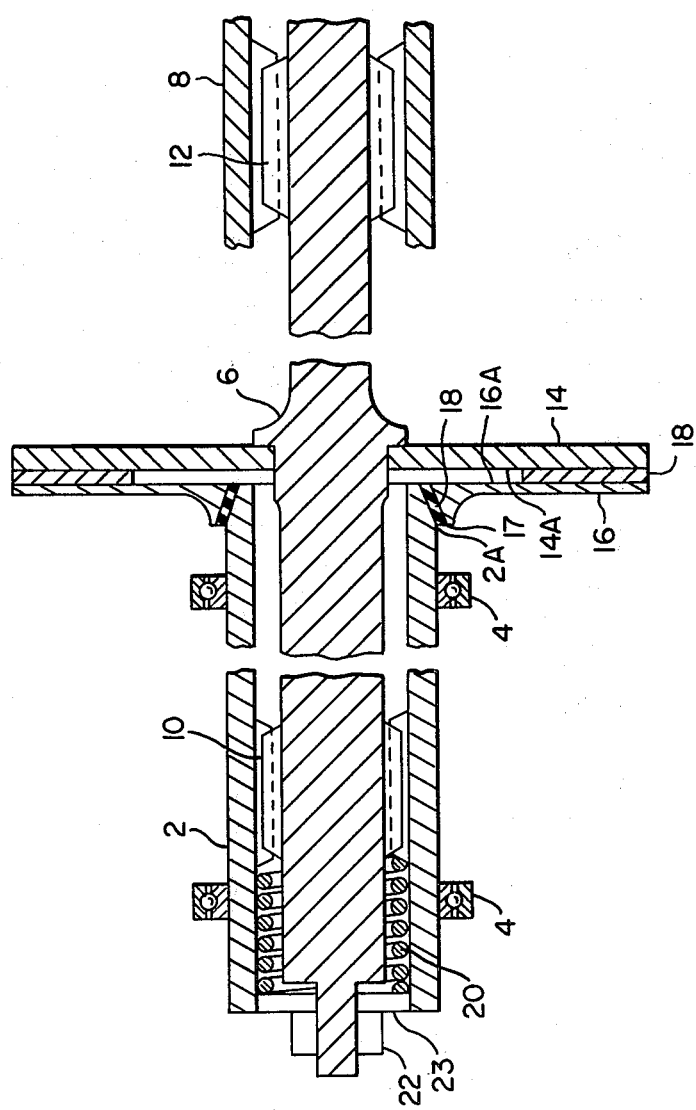

COMPLIANTLY MOUNTED DAMPING MEANS

BACKGROUND OF THE INVENTION

Typical rotating machinery includes a rotor shaft and a quill shaft which transmits power from a driver shaft to the rotor shaft. The quill shaft is coupled to the rotor shaft and to the driver shaft by means of splines. With the arrangement described, the quill shaft is effectively hinged at the splines to permit a certain amount of misalignment between the rotor and driver shafts. Usually the quill shaft is a long and slender member and torsional damping means is required to eliminate the possibility of exciting torsional resonant frequencies. This damping means includes a plate mounted to the quill shaft, and having a surface adjacent a surface on a plate mounted to the rotor shaft. A spring provides an axial force which maintains a prescribed load on the adjacent surfaces of the respective plates whereby the desired damping is provided.

In equipment of the type described, it is desirable that the plate mounted to the rotor shaft follow the static and dynamic angular displacement of the plate mounted to the quill shaft, which may occur due to shaft misalignment. Further, it is desirable to provide additional torsional damping and to provide axial damping. The present invention achieves these results by mounting the plate to the rotor shaft in a particular and novel manner.

SUMMARY OF THE INVENTION

This invention contemplates compliantly mounted damping means for rotating equipment of the type including a rotor shaft and a quill shaft coupling the rotor shaft to a driver shaft. The damping means includes a plate rigidly mounted to the quill shaft and a plate mounted to the rotor shaft, with the plate having surfaces maintained adjacent each to the other by an axial force exerted on the plates, whereby torsional damping is achieved. In order to permit the plate mounted to the rotor shaft to follow angular displacement of the plate mounted to the quill shaft as is desirable, a conical base in the rotor shaft plate which snugly retains a mating conical tip of the rotor shaft has an elastomeric member bonded thereto, whereby the rotor shaft is compliantly mounted to the plate to achieve the desired purpose and to achieve additional torsional damping and to achieve axial damping as well.

BRIEF DESCRIPTION OF THE DRAWING

The single FIGURE in the drawing is a sectioned diagrammatic plan view showing the invention.

DETAILED DESCRIPTION OF THE INVENTION

A rotor shaft which is at least partially hollow is designated by the numeral 2. The position of rotor shaft 2 is radially fixed by supporting bearings 4. A quill shaft 6 is surrounded by rotor shaft 2 and by a driver shaft 8 which is also at least partially hollow. Quill shaft 6 is coupled to rotor shaft 2 through spline means 10 and is coupled to drive shaft 8 through spline means 12, whereby shaft 6 transmits power from shaft 8 to shaft 2.

Quill shaft 6 and spline means 10 and 12 are arranged to act as if the quill shaft is hinged at the spline means to permit a certain amount of misalignment between rotor shaft 2 and drive shaft 8.

Since quill shaft 6 is usually a long and slender member, a torsional damper is provided to eliminate the possibility of exciting any torsional resonant frequencies. This torsional damper includes a metallic plate 14 shrunk on to quill shaft 6 and a metallic plate 16 mounted to rotor shaft 2. Plate 16 has a suitable friction material 18 bonded to its surface 16A, which is adjacent quill shaft plate surface 14A. Hence, the primary damping function is accomplished by virtue of the engagement of friction surface 18 on rotor shaft plate 16 and quill shaft plate surface 14A.

In connection with the mounting of rotor plate 16 on rotor shaft 2, the rotor shaft has a conical end 2A which fits snugly into a conical bore 17 in rotor shaft plate 16. A suitable elastomeric member 18 is bonded to conical bore 17, whereby rotor shaft end 2A is in snug contact with elastomeric member 18. Elastomeric member 18 may be of a synthetic rubber material such as for purposes of illustration, that manufactured by the Dupont Co. under their trade name Viton. Member 18 may be cemented or vulcanized to bore 17 as will be understood by those skilled in the art.

A spring 20 disposed within rotor shaft 2 and surrounding quill shaft 6 is compressed by tightening a nut 22 against a plate 23. Appropriate compression of spring 20 provides an axial load which maintains a predetermined force on the engaged surfaces of plate 14 and 16 to achieve the desired torsional damping.

As will now be seen from the invention as described and shown, the addition of elastomeric member 18 permits rotor plate 16 to follow any angular changes, static or dynamic, of quill shaft plate 14 which may occur due to shaft misalignment. Additionally, elastomeric member 18 is, in effect, a torsional spring which provides additional damping of torsional natural frequencies which may occur. Further, due to the conical shape of elastomeric member 18 and that of bore 16A to which it is bonded, the elastomeric member acts as an axial spring to provide damping of axial frequencies which may likewise occur.

There has thus been described compliantly mounted damping means which is an improvement over damping means for like purposes now known in the art in that misalignment between the driving and the driven shafts can be easily accommodated and torsional and axial frequencies which may occur can be more adequately controlled.

What is claimed is:

1. Compliantly mounted damping means for rotating equipment of the type including a rotor shaft and a quill shaft coupling the rotor shaft to a driver shaft, characterized by:

a first plate rigidly mounted to the quill shaft;

a second plate having a conical bore;

the rotor shaft having a conical tip which fits snugly into the conical bore;

means for compliantly mounting the second plate to the rotor shaft including an elastomeric member disposed within the conical bore;

means for providing an axial load, whereby the first and second plates are maintained adjacent each other to provide torsional damping; and the means for compliantly mounting the second plate to the rotor shaft permitting the second plate to follow the angular displacement of the first plate occurring due to misalignment between the respective shafts.

2. Compliantly mounted damping means as described by claim 1, further characterized by:
   the elastomeric member being bonded within the conical bore.

3. Compliantly mounted damping means as described by claim 1, further characterized by:
   the means for compliantly mounting the second plate to the rotor shaft being effective as a torsional resilient member to provide torsional damping.

4. Compliantly mounted damping means as described by claim 1, further characterized by:
   the means for compliantly mounting the second plate to the rotor shaft being effective as an axial resilient member to provide axial damping.

* * * * *